US008590373B1

(12) United States Patent
Van Bavel

(10) Patent No.: US 8,590,373 B1
(45) Date of Patent: Nov. 26, 2013

(54) SAP FLOW SENSOR APPARATUS

(76) Inventor: Michael Van Bavel, Sugar Land, TX (US)

(*) Notice: Subject to any disclaimer, the term of this patent is extended or adjusted under 35 U.S.C. 154(b) by 386 days.

(21) Appl. No.: 13/155,369

(22) Filed: Jun. 7, 2011

Related U.S. Application Data

(60) Provisional application No. 61/352,233, filed on Jun. 7, 2010.

(51) Int. Cl.
*G01F 1/68* (2006.01)
(52) U.S. Cl.
USPC ....................................... 73/204.23
(58) Field of Classification Search
USPC .............................. 73/204.23, 204.22, 204.16
See application file for complete search history.

(56) References Cited

U.S. PATENT DOCUMENTS

| 4,745,805 | A | * | 5/1988 | Granier | 73/204.24 |
| 4,817,427 | A | * | 4/1989 | Kitano et al. | 73/204.16 |
| 5,269,183 | A | * | 12/1993 | Van Bavel et al. | 73/204.22 |
| 5,337,604 | A | * | 8/1994 | Van Bavel et al. | 73/204.22 |
| 5,423,211 | A | * | 6/1995 | Senock et al. | 73/204.22 |
| 7,280,892 | B2 | * | 10/2007 | Bavel | 700/284 |

* cited by examiner

*Primary Examiner* — Jewel V Thompson
(74) *Attorney, Agent, or Firm* — Harrison Law Office, P.C.

(57) ABSTRACT

Sap flow sensor apparatus and concomitant methodology for determining the sap flow within plant stems of herbaceous plants and trees using a simplified Stem Heat Balance methodology. Optimum irrigation and utilization of beneficial plant health statistics are enabled using a sap flow sensor apparatus configured with a flexible, sealed sensor layer and multi-layered insulation including an elastic hook-and-loop attachment for enclosing the flexible, sealed sensor layer, soft-foam insulation, a waterproof membrane cloth permeable to water vapor and impermeable to water drops, and an outermost reflective barrier. Based upon the calculations derived from the simplified Stem Heat Balance formula, embodiments afford operational and economic efficiencies due to reduction of the prerequisite electronics to a 1-Channel dT signal.

35 Claims, 12 Drawing Sheets

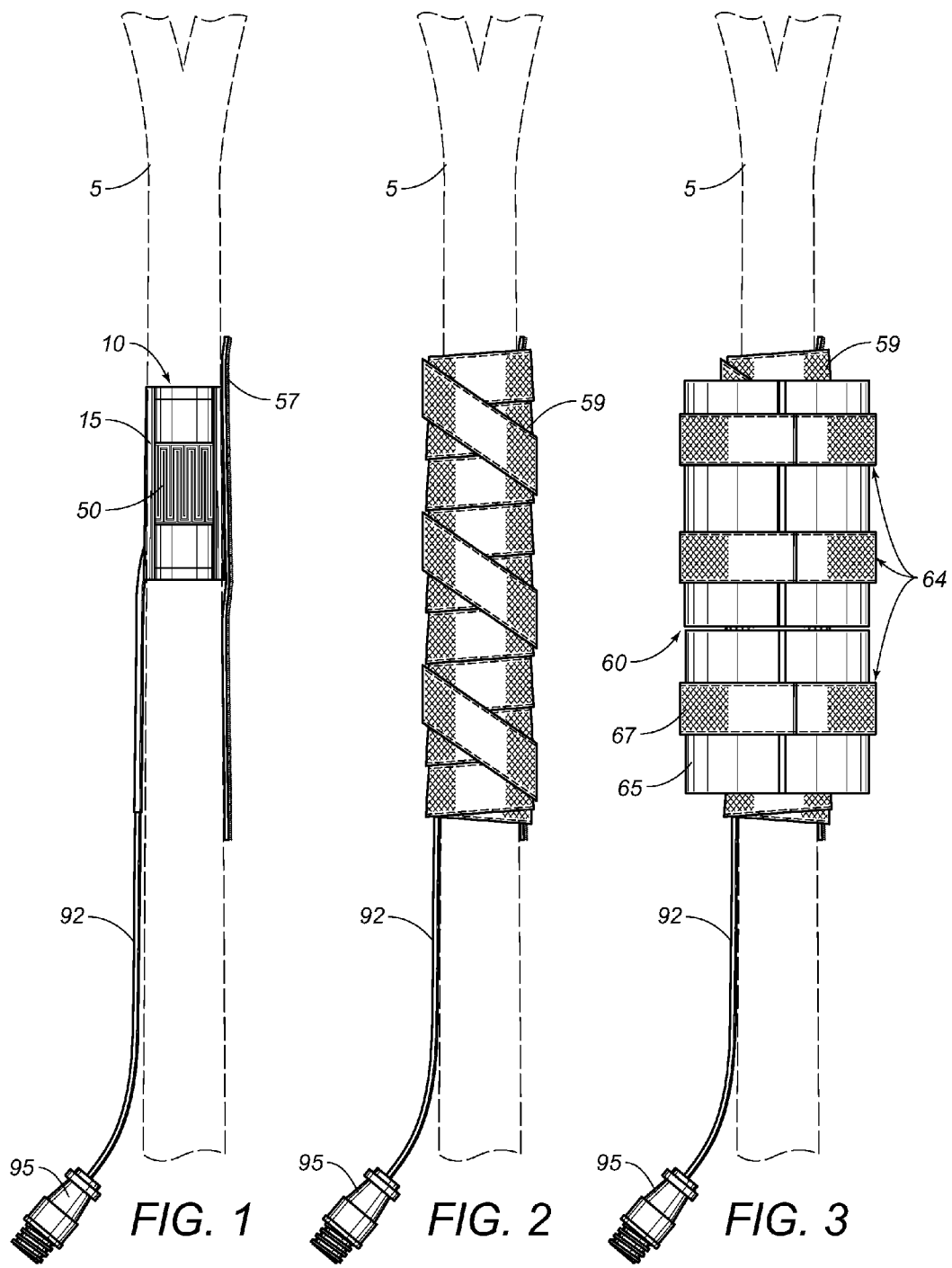

SAP FLOW SENSOR APPARATUS

RELATED APPLICATIONS

This application claims priority based upon Provisional U.S. Application Ser. No. 61/352,233 filed Jun. 7, 2010.

FIELD OF THE INVENTION

The present invention relates to an apparatus for measuring sap flow in plants and the like, and more particularly, relates to an apparatus configured with an exoskeleton electronics interior layer and concentric multi-layered insulation, for in situ installation in the field in order to directly and accurately measure sap streams in herbaceous plants and trees without the necessity for empirical calibration or for stem intrusion.

BACKGROUND OF THE INVENTION

The Stem Heat Balance ("SHB") method of estimating sap flow within a plant stem has been well established as being an accurate methodology applicable to sap flow behavior in many species under a diversity of field conditions. For instance, Lascano, Baumhhardt, and Lipe reported that consistent results had been obtained for grapevines during a 2-day period with overall accuracy ranging +/−5%. See, *Measurement of Water Flow in Grapevines using the Stem Heat Balance Method*, Am. J. Enol. Vitic. Vol. 43: (2), 1992. As another example, Devitt, Berkowitz, Schulte, and Morris reported that consistent results had been obtained for woody ornamental tree species with overall accuracy being +/−10% during a 3-day period. See, *Estimating Transpiration for Three Woody Ornamental Tree Species using Stem-flow Gauges and Lysimetry*, HortScience, Vol. 28 (3), March 1993.

Additional illustrative examples of the applicability of SHB methodology are described by O. Bethenod, N. Katerji, R. Goujet, J. M. Bertolini, and G. Rana in *Determination and Validation of Corn Crop Transpiration by Sap Flow Measurement under Field Conditions*, published in Theor. Appl. Climatol. 67, 153±160 (2000); and by Escalona, L. Flexas, J. and Medrano, H., in *Comparison of Heat Balance and Gas Exchange Methods to Measure Transpiration in Irrigated and Water Stressed Grapevines*, published in Acta Hort. 526 ISHS (2000). Moreover, U.S. Pat. Nos. 5,337,604 and 5,269,183, each entitled "Apparatus for Measuring Sap Flow," issued Aug. 16, 1994 and Dec. 14, 1993, respectively, to Cornelius H. M. Van Bavel and Michael G. Van Bavel, further elucidate the state of the art regarding sap flow measuring apparatus; both the '604 and '183 patents are fully incorporated herein by reference.

Referring to FIG. 10 which appears in each of the '604 and '183 patents, and is repeated herein for convenience as FIG. 11, the original formula for SHB sap flow rate is based on the following energy balance formula:

$$SF=(Pin-Qv-Qr)/Cp*dT \text{ (grams/second)} \quad (1)$$

wherein sap flow (SF) is derived from an energy balance having the following components: heat input, Pin or Qi; radial heat loss, Qr; axial heat loss, Qv; specific heat, Cp; and temperature change, dT. Formula I will be hereinafter referred to as "the "original formula" for SHB sap flow rate; since the present invention incorporates an enhanced but simplified version of this formula, the simplified formula will be hereinafter referred to as an "improved formula" for SHB sap flow rate and will be abbreviated as "iSHB" for convenience. As will be appreciated by those skilled in the art, prevalent implementation of current sap flow sensor technology incorporates two pair of thermocouples equally spaced above and below a heating element, which is wrapped around the exterior of a selected plant stem. But, as is known to practitioners in the art, a deficiency of such implementation has been that neither heat gain nor heat loss from heat storage in the sensor's measurement section has been considered in this sap flow calculation.

Continuing with prevalent sap flow sensor implementation, a thermopile with multiple junctions has typically been wired circumferentially of the heater—in order to compute the radial heat loss, Qr, as a function of axial heat loss, Qv, convective heat loss, Qf, and heat input, Qi or Pin.

$$Pin=Qr+Qv+Qf \text{ (watts)} \quad (2)$$

The convective heat loss by the sap flow (Qf) is determined by rearranging equation 2, per the following equation:

$$Qf=Pin-Qr-Qv \text{ (watts)} \quad (3)$$

As will be appreciated by those skilled in the sap flow art, a heater strip provides energy into the stem (Pin) that may be readily computed from Ohm's law, i.e., $Pin=V^2/R$, in which heater impedance, R in Ohms, corresponds to a measured and recorded constant, with voltage, V, being monitored at the sensor input or the heater voltage regulator output.

It will be understood that Qr, the radial heat loss, reaches a maximum at night, since there is usually minimal or no sap flow at night. Thermopile voltage, Ch in mV, may be measured for a few hours before dawn, and a zero set may be typically performed to determine the corresponding heat conductance constant, Ksh in w/mV, which may be computed from the energy balance assuming that convective heat loss, Qf, by the sap flow, is zero.

$$Ksh=(Pin-Qv)/Ch \text{ (Watts/milliVolts)} \quad (4)$$

Once the constant Ksh has been determined, then radial heat loss, Qr, may be calculated. Experience teaches that the radial heat loss, Qr, decreases as more of the heat is absorbed by sap flowing through the stem:

$$Qr=Ksh*Ch \text{ (Watts)} \quad (5)$$

It will be understood by practitioners in the art that Fourier's Law describes the vertical, axial conduction along the upward path of heat flow, which may be subdivided into an upward component, Qu, and a downward component, Qd:

$$Qv=Qu+Qd \quad (6)$$

where $Qu=Kst*A*dTu/dX$ and $Qd=Kst*A*dTd/dX$. Kst corresponds to thermal conductivity of the stem (Watts/meter-° K) established by previous testing for a variety of woody or herbaceous plants; A corresponds to the stem cross-sectional area (square meters) measured from each individual plant's diameter; dTu and dTd correspond to the upward and downward temperature gradients (° K) along the path of heat flow, respectively; and dX is the spacing between thermocouple junctions (meters).

It will be understood by those skilled in the art that, in U.S. Pat. No. 5,337,604, there are two differentially wired thermocouples—with each thermocouple measuring not only rising sap temperature, but also measuring axial heat conduction, Qv. Channel Ah measured the temperature difference A-Ha (mV); Channel Bh measured temperature differential B-Hb (mV). Subtraction of these two signals Bh-Ah yielded two signals proportional to axial heat conduction emanating out of stem section, Qu and Qd. Since the distances separating the upper thermocouple, TC, pair and lower TC pair were fixed by design to the same value for each particular sensor, the components of Qv were combined with common denominator, dX. The voltage measured by the thermocouple signals was then converted by a constant for a typical T-type thermocouple (0.040 mV/° C.) to temperature measured in ° C.

$$Qv=Kst*A(BH-AH)/dX*0.040 \text{ mV}/° \text{ C. (W)} \quad (7)$$

The temperature increase of the sap was measured by the same pair of thermocouples, by adding signals Ah and Bh, averaging, and then converting the resultant signal to ° C.:

$$dT=(Ah+Bh)/2*0.040 \text{ (° C.)} \quad (8)$$

Computing convective heat loss, Qf, is then determined from equations (3), (5), and (7), whereupon Qf is then converted to sap flow. It will be understood that, to convert convective heat absorbed by the sap, Qf is divided by the specific heat of water (4.186 j/g ° C.), whereupon sap temperature increase may be obtained from equation (8).

$$SF=(Qf)/Cp*dT \text{ (g/s)} \quad (9)$$

Plant stem temperature variation known to be attributable to changes manifest between the ground and the stem—as a function of ambient fluctuations—is commonly defined as the "Natural Temperature Gradient" typically represented by acronym "NTG." Test methods to determine NTG are invoked by practitioners in the art to confirm that a valid sap flow sensor installation has been achieved, and, occasionally, to adjust sensors in situ in the field as appropriate for refining sap flow calculations. See, for example, *"The Effect of Environmentally Induced Stem Temperature Gradients on Transpiration Estimates from the Heat Balance Method in Two Tropical Woody Species,"* by V. M. Gutierrez, A. R. Harrington, C. F. Meinzer, and H. J. Fownes published in Tree Physiol, 14:179-190, 1994).

As is well known in the art, NTG is most severe not only during the first two to four hours after sunrise, but also during periods of rainfall. At very low flow rates and on large stems, e.g., tree trunks having diameter greater than 50 mm, improvements to the SHB method have been suggested which account for heat storage, Qs. See, for example, *"Including the Heat Storage Term in Sap Flow Measurements with the Stem Heat Balance Method"* by V. L. Grime, J. I. L. Morison, and L. P. Simmonds, published in Agricultural and Forest Meteorology 74, 1-25, 1995. In other published examples based upon data obtained from a wide range of sensors, the heat storage effect has been found to be very small and thus cancels-out on a daily basis, under stable conditions.

If sap flux heat, Qf, were relatively small compared to large ambient stem heat variation, or if intense scrutiny of momentary or hour-by-hour sap flow were required, then more complex sensor construction and installation methods would be prerequisite to properly account for stored heat, Qs. Unfortunately, there have been no commercial products developed in the art that have engendered economic construction and/or an economic recording methodology. Moreover, there appears to have been no actual demand heretofore for such commercial Qs-measurement solutions. It will be understood by practitioners conversant in the art that the most severe effect of Qs is in the morning—just after sunrise—when heat stored in a sap flow sensor section is released via initial sap movement, followed by instantaneous upward heat dissipation into and through the ambient.

Problems with sap flow measurements under field conditions have been reported in published literature related to moisture and adventitious root development in plants such as corn, willow, and poplar trees. See, O. Bethenod, et al., "Determination and Validation of Corn Crop Transpiration by Sap Flow Measurement under Field Conditions" published in Theor. Appl. Climatol. 67, 153-160 (2000). Even in arid climates, characterized by inherently high evapotranspiration, plants transpire though their respective stems while moisture accumulation causes thermocouple damage over time. Practitioners in the art have learned that, to extend thermocouple lifespan to at least three years, sensors must be frequently moved to other locations—sometimes weekly, e.g., corn plants.

Moreover, unpublished reports emanating from the University of Arizona have described damage to sensors caused by moisture accumulation thereon, when such sensors have been installed on willow and poplar. In particular, it has been observed that moisture accumulation causes bark damage effectuated by mold and mildew, tending to cause consequential damage to sensor coatings and to implicated insulating collars. Eventually, corrosion causes damage to crucial sensing thermocouples and associated thermopile electronics. Since such corrosion damage is obviously irreparable, costly replacement of entire sap flow sensors would be required to sustain accurate field measurements of sap flow. For instance, in field applications of sap flow sensors on commercial grapevines, sensors typically remain in situ for several months. Accordingly, commercial services providing sap flow data have heretofore required costly recurring maintenance of sap flow sensors in the field.

It will be readily appreciated that field research projects and commercial applications usually require fitting sensors to a plethora of highly irregular shapes, especially manifest in environments featuring cultivated. Under such grape vine laden circumstances, vine trunks inherently twist and include tightly-spaced scars derived from old petioles, and frequent pruning. Furthermore, oval irregularly-shaped and scarred surfaces are manifest by cordons. Practitioners in the art have been challenged by a long-standing deficiency that sap flow apparatus seeking to commercially measure sap flow in corn, soybean, cotton, tomato, and many other crops lack a convenient and expeditious installation methodology that is not only inherently flexible and adaptable, but also affords significantly less-frequent maintenance and routinely effectively seals electronic wiring.

For commercial sap flow measurement applications on grapes and like crops, there is, of course, considerable variation of soil type, terrain, and irrigation-water distribution. While SHB sap flow methodology has been shown to be very effective, nevertheless, multiple plants in a particular field need to be monitored in order to generate measurements that are representative of variable field-water conditions. Indeed, experience has demonstrated that preferably at least four to eight plants should be monitored to obtain adequate statistics pertaining to water consumption and water stress.

In view of the substantial number of sensors required to adequately encompass a field of crops, from a practical vantage point, costs attributable to sensors and to data collection must be significantly reduced in order to gain wide commercial acceptance. As is well known to practitioners skilled in the art, a substantial portion of sensor construction cost has been attributable to labor associated with assembling prerequisite electronics. But, another substantial portion of sap flow measurement cost is attributable to construction of a reliable integrated sensor collar that includes and encompasses the contemplated number of electrical connections prerequisite for computing the energy balance from which sap flow may be converted.

It will be appreciated that current sap flow sensors implementing SHB methodology require four data signals for operation: two signals provided by each of two pair of differential thermocouples. In a manner known in the art, each differential thermocouple pair provides a signal not only indicative of temperature gradient above and below the sensor heater, respectively, but also indicative of conducted stem heat transfer. A third signal is generated from a thermopile, indicative of radial heat flux corresponding to heat loss to the ambient. A fourth signal is indicative of the millivoltage delivered to the sensor heater.

Signal processing data loggers, e.g., the "Flow4" System disclosed in U.S. Pat. No. 7,280,892, incorporated herein fully by reference, have proven to be relatively expensive due to the necessity for four differential channels required for each sensor connection. It will be appreciated by those skilled in the art that three of these four channels must be capable of resolving signals accurately to one microvolt. This demanding requirement and other factors render such monitoring apparatus rather expensive, thereby foreclosing many commercial applications which would clearly benefit from implementations of such Flow4 technology.

SHB sap flow sensor performance has been examined and analyzed during numerous scientific studies. Several publications elucidate computer simulations and report both expected accuracy and deviations manifest under strong ambient temperature changes at low flow rates. For example, Peramaki, Vesala and Nikinmaa, in 2001, published a study of the applicability of the heat balance method for estimating sap flow in boreal forest conditions. See, Boreal Env, Res 6:29-43 (ISSN 1239-6095).

Underestimates in steady-state conditions were reported to be caused by inaccurate sap temperature estimates. When early morning conditions were studied, NTG manifest as differences in air and sap temperatures, and the release of stored heat, Qs, causing problematic sap flow results having substantial peaks. For these early morning conditions, the problematic results suggested that measurements should be taken that were more representative of sap dT entering into the stem sensor, wherein the difference in rising sap temperature would devolve to significant accuracy-improvement. Contemporary experiential studies seem to demonstrate that dT sap temperature measurement is a critical prerequisite to achieving more accurate sap flow results.

Since the original SHB design has measured conduction equidistant above and below the sensor heater—manifest as equal amounts of Qu and Qd—typically dT will be zero or very close to zero at a zero sap flux state, Qf, every morning before dawn. Moreover, since dividing by zero or by nearly-zero causes infinite results, i.e., huge inaccuracies, software-based filters have been commonly used to disregard dT at low flow below 75° C., and to avoid division by zero. See, Dynamax Dynagage Manual and U.S. Pat. No. 7,280,892, col 10.

Sap flow simulations reported by Peramaki, Vesala and Nikinmaa, in view of studies of sensor construction have accommodated dT temperature sensors being positioned symmetrically, one pair slightly below the sensor heater and one pair slightly thereabove. Published research and computer simulations apparently have nevertheless not accommodated installations that typically require overlap of the sensor heater, which, in turn, inevitably causes an uneven distribution of heat across the plant's stem. Ergo, more heat is commonly concentrated at the heater strip overlap than otherwise, whereupon the dT (temperature) measurement is conventionally taken on the opposite side of the stem. Practitioners in the art will readily understand that this prevalent protocol causes a gradient that is manifest as a dT temperature underestimate, not contemplated by the simulations. It will be appreciated that this heater overlap is practicably unavoidable, so that a range of sensor diameters can be accommodated using a single sensor and a fixed heater width.

The sap flow means and techniques heretofore known by those skilled in the art have suffered from a panoply of deficiencies: failing to remove or diminish the effects of NTG; manifesting concerns for moisture damage to both plant and sensor; unreliably installing and implementing sensors over irregular plant surfaces; and requiring at least four data channels. This panoply of deficiencies has continued to render current sap flow detection and measurement technology unaffordable in many beneficial scenarios. Accordingly, these limitations and disadvantages of the prior art are overcome with the present invention, wherein improved means and techniques are provided which are especially useful for ascertaining sap flow in herbaceous plants and trees.

SUMMARY OF THE INVENTION

As will be hereinafter described in detail, embodiments of the present invention comprise extraskeletal devices for measuring sap flow in the stems of herbaceous plants and trees using novel applications of the improved Stem Heat Balance methodology (abbreviated herein as "iSHB" for convenience) contemplated herein. Preferred embodiments of the present invention will be described that have been configured with a synergistic combination of a plurality of components according to this instant iSHB methodology. In particular, preferred sap flow sensor embodiments will be seen as comprising a flexible and sealed sensor layer circumscribing a plant stem and the like, an elastic attachment means for enclosing the plant stem and circumscribed sensor layer, a multi-faceted insulation layer circumscribing the inner layers, a water vapor-permeable fabric layer further circumscribing the inner layers, and an external reflective barrier layer enclosing all of said internal layers.

It will be understood by those skilled in the art that each such component comprises an individual layer that is successively and securely enclosed within outer protective layers—for providing a reliable and an accurate in situ sap flow sensor apparatus affording considerable cost savings above and beyond sensors currently known in the art. As will become clear to those skilled in the art, multi-layered sap flow measurement embodiments contemplated by the present invention are preferably affixed to stems of herbaceous plant or tree in situ, while simultaneously overcoming persistent and seemingly unavoidable limitations associated with affixing sensors to oddly-shaped stems including superficial debris and any other extraneous loose surface imperfections—and thus reliably obtaining accurate sap flow measurements.

A device constructed according to the teachings of the present invention comprises a flexible, sealed innermost sensor layer having a plurality of thermocouples properly positioned therein. It is contemplated hereunder that this sealed electronics assembly constituting an "exoskeleton" structure, may be judiciously emplaced and secured about a suitably selected and prepared section of a plant stem and then a series of outer insulating and protective layers may be installed in situ.

It has been found that suitable flexible multi-layered sealing material should preferably be invoked in order to simultaneously achieve waterproof, resistance to ultraviolet light, and dielectric characteristics imparted to a thoroughly sealed and protected sap flow sensor contemplated hereunder.

An illustration of such a suitable sealing material for effectively encapsulating the interior electronics, albeit not in any way intended to constitute a limitation, is Star brite Liquid Electrical Tape manufactured by Kinpak, Inc. of Montgomery, Ala. As a representative sealant, this liquid should preferably be applied using a brush or like applicator to thoroughly protect the interior electronics contained on a flexible cork substrate or the like, by rendering it waterproof, UV-resistant, dielectric-coated, and tending to prevent corrosion on wires and terminals. As will be become clear, the electronics assembly of the present invention comprising a plurality of specially configured and arranged thermocouples, thermopile heating strip, and concomitant electrical wiring should preferably be configured residing within a flexible substrate or similar resilient material, which has been thoroughly sealed to sustain the longevity of these implicated electronic components.

It will be seen that the sensor layer should preferably be secured circumferentially of the plant stem with an elastic securing tape-like material exemplified by commonly-available Velcro® Velstretch® hook-and-loop fastener straps—snuggly and frictionally wrapped thereabout—to assure and sustain maximum sensor contact with the stem, even when situated proximal to and around irregularly-shaped stems. Thus, it will become evident that embodiments of the present invention assure greater contact with enclosed stems even under exigent circumstances implicating irregularly-shaped stems and the like—manifest by a plurality of twists, scars manifest from old petioles and cordons—attributable to a uniquely-accommodating layered structure configured circumferentially thereof in a manner heretofore unknown, unexpected and, indeed, formerly considered to be impracticable in the art.

Once the electronics body is emplaced on a plant stem, sustained optimal contact between this engulfed plant stem and sap flow measurement embodiments contemplated hereunder, and concomitant isolation thereof from adverse affects of the ambient and the like, is promoted and furthered by incorporation of this specially-adapted elastic hook-and-loop fastener layer which further affords the benefit of accommodating ongoing plant growth and diurnal swelling. It will be appreciated that its inherent in situ margin tends to drastically lessen labor costs that unavoidably flow from installation and maintenance in the field.

Of course, practitioners in the art will readily appreciate that such sap flow sensor measuring embodiments may be installed loosely or tightly simply by adjusting the attachment mechanics of elastic hook-and-loop fasteners or the like. Accordingly, it has been anticipated that time-to-service may be extended from one or two to as much as three months when installed upon slow-growing plants, e.g., grapevines and trees. Similarly, it is anticipated that time-to-service may be extended to two months or more when installed on faster-growing species, e.g., cotton and soybean.

Preferred embodiments thus comprise specially configured insulation having multiple functional layers emplaced in situ circumferentially of the secured inner sensor layer subsequent to the sensor layer, in turn, having been emplaced in situ circumferentially of the plant stem or the like. A particularly effective insulation layer comprises Insul-Tube® soft-cell foam manufactured by Halstead of North Carolina, wherein its closed-cell insulating properties derive from a matrix having a plethora of small-diameter holes. To sustain the integrity of this soft-cell foam material, it is preferable to seal its edges by applying a suitable resin coating exemplified by Halstead "67×44" synthetic resin. It will be appreciated that a unique advantage of the present invention will be seen to be that this multi-layered insulation functionality can be deemed to be an easily-replaced consumable, if damaged, whereupon replacement may be routinely effectuated.

On an outer layer of this multi-layered insulation, there should preferably be emplaced a membrane cloth permeable to water vapor, but impermeable to water drops. This membrane cloth surrounds both the innermost sensor layer and the circumscribing insulation layers, thereby preventing ingress of rainwater, while simultaneously allowing water vapor flux to exit to the surrounding ambient, while also preventing accumulation of condensate within the sensor. Accordingly, water vapor exits the sensor area through the vapor-permeable layer while the circumscribing layer sheds water that condenses on a sheath between the sensor insulation and the reflective material disposed on the sensor's outermost layer. It has been observed that embodiments of the present invention facilitate water droplets running down the outer layers to ground.

In an alternate embodiment of the present invention, an angled configuration of thermocouples may be embedded within the cork substrate in the flexible innermost wiring layer, in order to achieve even greater thermocouple-to-plant stem contact than would otherwise be practicable.

It is accordingly an object of the present invention to provide a means and method for measuring the sap flow in the stems of herbaceous plants and trees while reducing or removing NTG effects.

It is also an object and advantage of the present invention to determine the sap flow of herbaceous plants and trees accurately and non-intrusively by invoking an in situ apparatus having simpler construction and concomitant wiring than has been heretofore known in the art.

It is another object and advantage of the present invention to assemble a sap flow measuring apparatus in situ using a single wrapping of heat-sensing electronics and an integrated heater, forming an exoskeleton configuration which is then engulfed, in turn, within multi-layer insulation and an external infrared radiation shield layer.

It is also an object and advantage of the present invention that the sap flow of herbaceous plants and trees may be accurately determined on irregularly shaped plant surfaces.

It is also an object and advantage of the present invention to reduce or eliminate moisture damage resulting from sap flow measurements of stems of herbaceous plants and trees.

It is also an object and advantage of the present invention that the sap flow of herbaceous plants and trees be accurately determined by a convenient portable device using only three or fewer data channels.

These and other objects of the present invention will become apparent from the following specifications and accompanying drawings.

BRIEF DESCRIPTION OF THE DRAWINGS

FIG. 1 depicts a frontal perspective view of the innermost layer comprising sap flow sensor electronics member including an adjacent heating element embodying the present invention, after being installed on a plant stem.

FIG. 2 depicts a frontal perspective view of the sap flow sensor embodiment of FIG. 1, after the electronics member has been circumscribed with a tape wrap member layer, forming an exoskeleton member FIG. 3 depicts a frontal perspective view of the sap flow sensor embodiment depicted in FIG. 2, after the tape wrap member layer has been circumscribed with an insulation layer.

DETAILED DESCRIPTION

Figure 4:
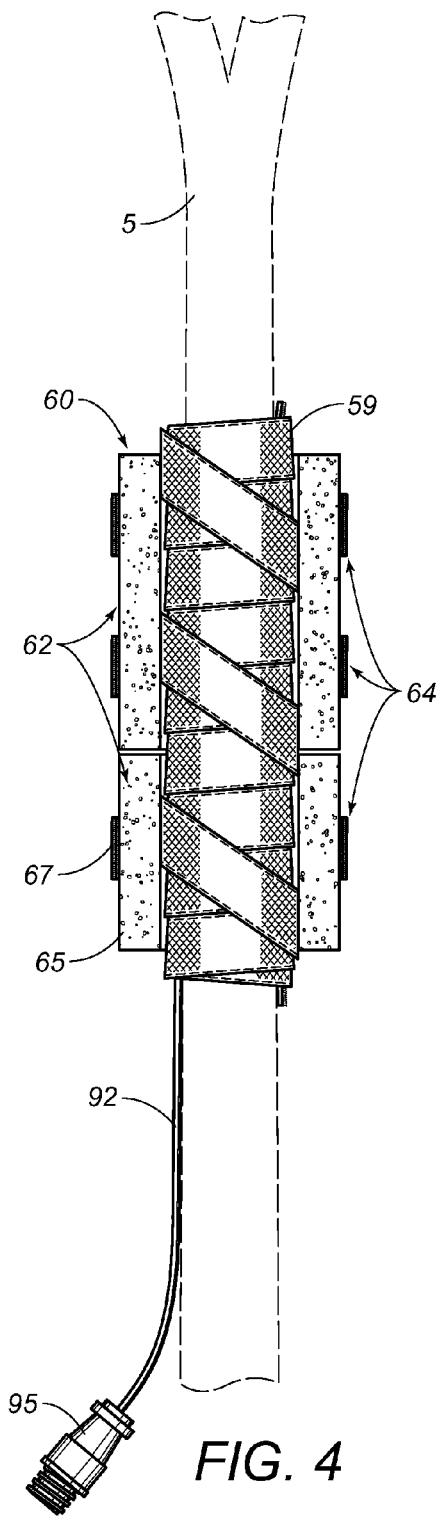
FIG. 4 depicts a partial frontal cut-away view of the sap flow sensor embodiment of FIG. 3 depicting an outer layer comprising a plurality of insulating colors engulfing the already wrapped sap flow measurement electronics.

Reference is made herein to the figures in the accompanying drawings in which like numerals refer to like components. Now referring to FIGS. 1-7, there are depicted multiple frontal views of the preferred embodiment of the present sap flow sensor apparatus using iSHB methodology taught hereunder. Effectuating a significant departure from the current art, the present invention preferably collects only one reading of dT, thereby eliminating the need to read Qu and Qd, since all of the conduction energy losses are grouped or lumped together into one value, Qc. As will be herein described in detail, this new Qc value is determined from a radial thermopile imbedded in electronics assembly body member 10 (exposed in cut-away view in FIG. 1), which is assumed to constitute all heat conduction which has been experimentally corroborated as will be hereinafter elucidated.

It has been found that Qv typically constitutes 10 to 20% of the Qr value, and, if the two values are combined into one Qc variable, there is a valid energy balance that may be computed. In this instance, a new sheath conductivity, Ksh', should be calculated.

Equation 1 is now simplified to yield the following equation:

$$SF'=(Pin-Qc)/Cp*dT \qquad (10)$$

The energy balance previously represented in equation 2, now becomes:

$$Pin=Qc+Qf' \text{ (W)} \qquad (11)$$

Equation 3 becomes:

$$Qf'=Pin-Qc \text{ (W)} \qquad (12)$$

The Sheath conductivity constant at zero flow (Qf=0) is simplified from Equation (4):

$$Ksh'=Pin/Ch \text{ (W/mv)} \qquad (13)$$

It will be understood that the heat from conductivity is entirely based on the radial power, including any increase in the Ksh value due to lumping of Qv and Qr into the same result as Qc. It has been found that, in the preferred embodiment of the present invention, the Ksh value will be 10 to 20% higher than a Ksh value that only includes radial heat. Therefore, Equation (6) and Equation (7) are no longer needed as performance does not change significantly by doing so.

$$Qc=Ksh*Ch \text{ (W)} \qquad (14)$$

Electronically averaging or using only one signal for dT yields a simplified version of Equation (8):

$$DT'=Abh/0.040 \text{ mV}/° \text{ C. (C)} \qquad (15)$$

A new energy balance equation results from simplifying Equation 12 to reflect the advantages afforded by the preferred embodiment:

$$SF'=Pin-Qc/Cp*dT \text{ (g/s)} \qquad (16)$$

New sap flow sensor embodiments and the concomitant iSHB methodology disclosed herein reduce the complexity of sap flow sensor construction to a level heretofore unknown in the art. More particularly, according to the present invention, the amount of components incorporated into and prerequisite for constructing a single sap flow apparatus—electrical wiring, connectors, copper cable conductors—and assembly-labor is significantly less than previously required. Furthermore, the number of data logging channels necessary is reduced by 25%.

The present invention, besides simplifying applicable energy balance equations, likewise also reduces prerequisite computations. Of course, as a consequence of such equation and calculation-simplification, the preferred embodiment tends to mitigate difficulties associated with determining a plurality of parameters or factors involving a plant stem, e.g., stem area and conductivity, and particular constants of each sensor—per Equations 6 and 7. From a zero set based on nighttime null sap flow, and a thermal conductivity setting, Ksh, a practitioner easily determines implicated parametric stem-related values by interpreting energy balance results per Equation 12.

It will be appreciated by those skilled in the art that traditional SHB sap flow sensors typically manifest errors. For instance, just after dawn, as a result of NTG, sap flow experiences a positive dT swing as a function of Qs, and thereafter experiences a negative dT swing. The present invention reduces or eliminates such NTG-related errors through placement of the lower temperature sensing point further away from the heating element. It will become clear that such optimal sap flow sensor placement greatly reduces negative NTG and positive Qs temperature-effects by positioning the lower thermocouple sufficiently remote of the heater.

It should be clearly understood that, while thermocouple and thermopile implementations are discussed and described herein, embodiments of the present invention may incorporate virtually any comparable electronic device and/or sensor that accomplishes the purposes contemplated herein. By way of example, but not intended to in any way limit the scope of the present invention, rather than invoking a thermocouple as a preferred temperature-sensing device, a thermistor or infrared temperature sensor or the like may be incorporated into an implementation.

That is, it has been found that, by positioning the lower thermocouple further downstem, a more representative ambient reference is obtained at all times. Such thermocouple emplacement ideally creates about a one-degree positive offset when sap flow is substantially zero, yet yields a more accurate measurement of the ambient sap flow into the measurement section of the preferred embodiment. Moreover, such emplacement of the lower sensor is preferably offset away from the heater to avoid downward heat conduction, Qd, and consequently avoiding temperature swings otherwise caused by a combination of NTG and Qs.

Referring specifically to FIG. 1, there is seen flexible cork substrate 15 with body member of electronics assembly 10 affixed to the interior surface thereof; cork substrate 15 incorporates pyroelectrically-sensitive film functioning as a milliwatt heater disposed longitudinally thereof and fixedly attached thereto. This pyroelectrically-sensitive film is preferably comprised of Kapton and etched Iconel within a laminated flexible Mylar assembly. The cork substrate layer 15 is installed in situ by appropriately flexing it to snuggly and securely circumscribe plant stem 5. It will be appreciated that this cork substrate layer comprises thermopile member 40 which circumscribes heater member 50 of electronics assembly 10. As will be described in detail hereinafter and referring to FIGS. 8-10, thermopile member 40 comprises a plurality of copper-constantan thermocouples connected in series, affording a highly-sensitive thermocouple above room temperature to about 60° C. and even at low temperatures to −25° C. Lead wire 92 electrically interconnects electronics assembly 10 with external data loggers for monitoring signals representative of sap flow computations (not shown) via electrical plug connector 95.

Figure 8:
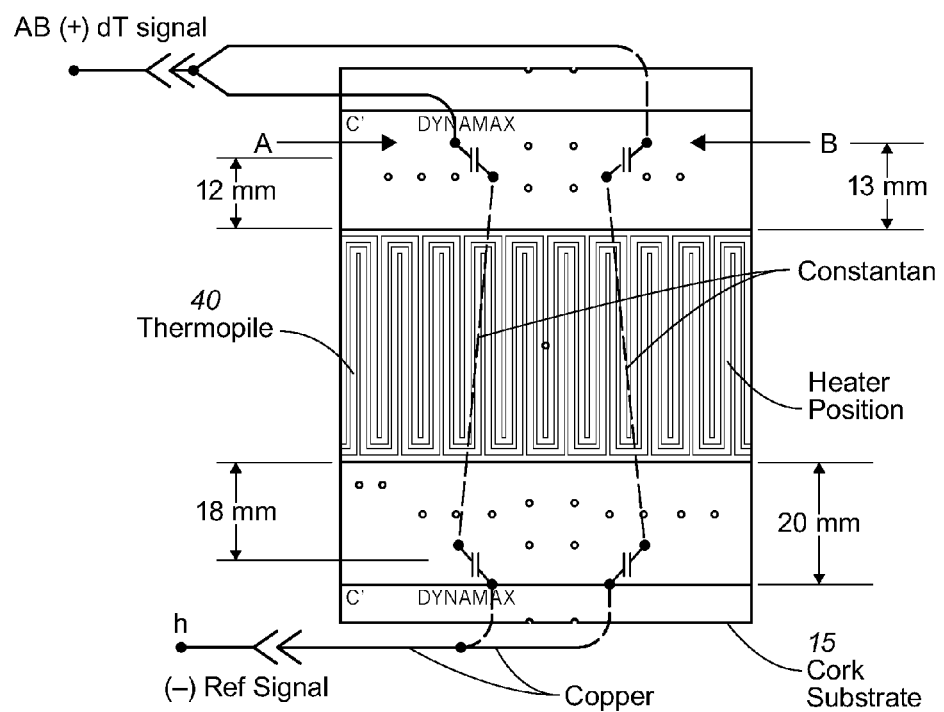
FIG. 8 depicts a cork substrate constructed with an exemplary configuration of a plurality of thermocouples and threaded with constantan copper wire according to a sap flow sensor embodiment of the present invention.
Figure 9:
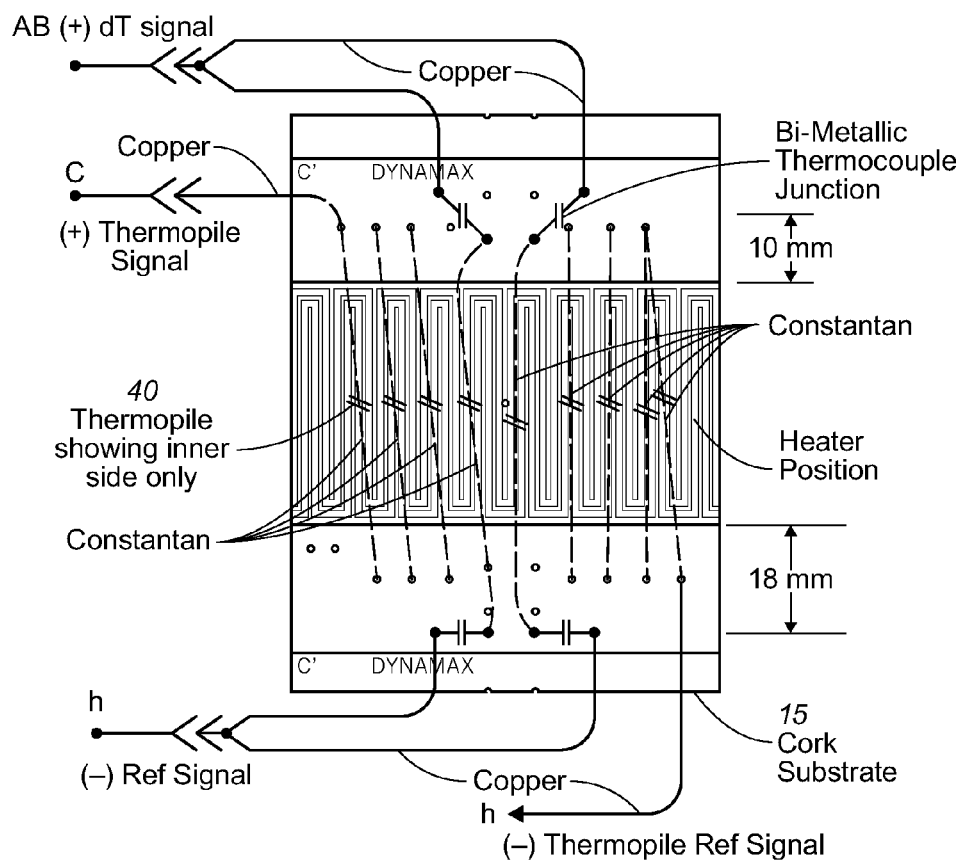
FIG. 9 depicts a cork substrate constructed with another exemplary configuration of a plurality of thermocouples and threaded with constantan copper wire according to a sap flow sensor embodiment of the present invention.

Referring now to FIGS. 8 and 9, there are depicted preferably flexible cork substrates constructed with exemplary configurations of a plurality of thermocouples and threaded with constantan copper wire according to a sap flow sensor embodiment of the present invention. More particularly, the TC-A and TC-B pairs are wired in parallel in the preferred embodiment of the present invention, thereby automatically averaging two signals into one dT. This unique and especially advantageous feature of the present invention is referred to as a "1-channel dT signal," in contrast to prior art embodiments which require 2-channels. It will be readily understood that the approach taught herein requires only one-half of the signal processing heretofore prerequisite for measuring sap flow dT.

In FIG. 8 there is shown an exemplary embodiment of the present invention only, a 25 mm (diameter) sensor circuit may be formed by placing thermocouple-A (TC-A) and thermocouple-B (TC-B) pairs in two circumferential stem positions, one position above and the other position below a sensor heater. It should be understood that both TC-A and TC-B are wired together to yield an averaged single reading. Midpoints of TC-A upper position and TC-B upper position are preferably 1.2 cm above the heater. Similarly, TC-A and TC-B lower positions are at least 1.8 cm below the heater. Practitioners in the art will appreciate that the low position of the thermocouples is an offset, causing a +0.5° C. to +1.0° C. difference in dT, since the affect of Qd is minimized. Significantly, positioning the lower thermocouples approximately 50% to 100% farther from the heater than positioning the upper thermocouples, based upon heuristic evidence observed during testing, tends to mitigate influence of downwards conductive heat, which, in turn, enables more accurate ambient sap temperature measurement.

TC-A and TC-B pairs may be angled in order to achieve maximum surface contact under exigent surface-characteristics circumstances wherein irregularly-shaped stems ordinarily seriously limit the degree or extent to which adequate surface contact between a sap flow sensor and a stem may be reasonably established.

Figure 10:
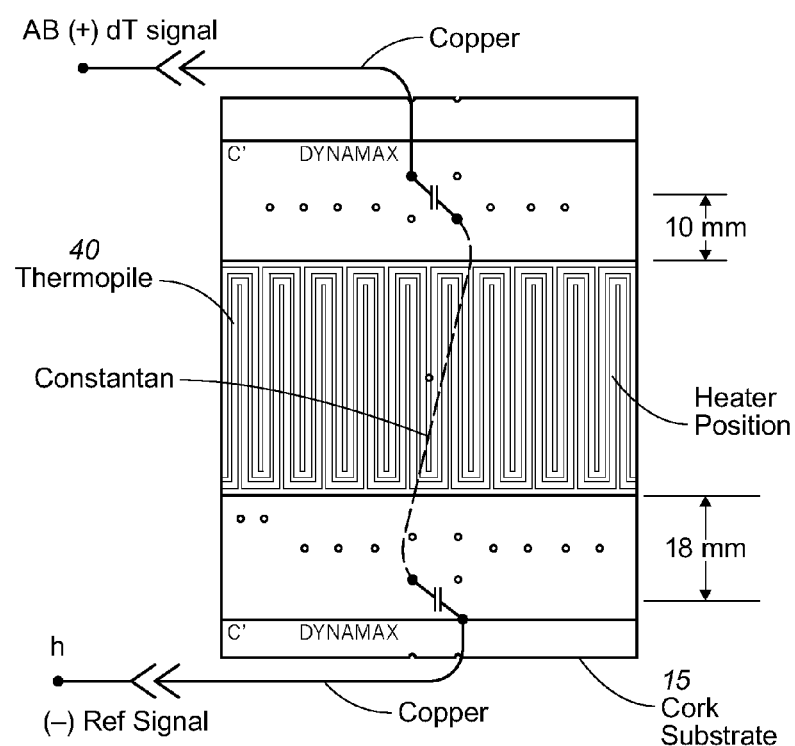
FIG. 10 depicts a cork substrate constructed with another exemplary but simplified configuration of a plurality of angled thermocouples and threaded with constantan copper wire according to a sap flow sensor embodiment of the present invention.
Figure 11:
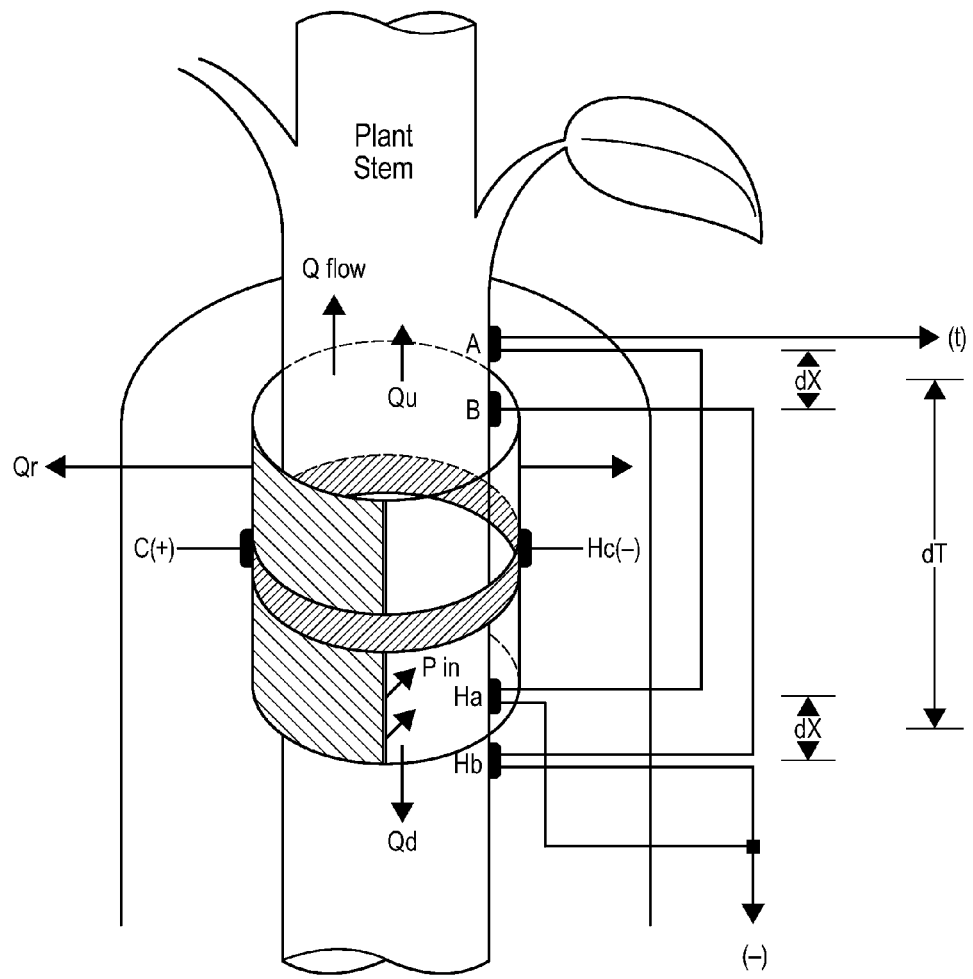
FIG. 11 depicts a schematic diagram depicting the heat transfer components of a typical plant stem typically measured by prior art sap flow sensor embodiments.

Now referring to FIG. 10, there is depicted a flexible cork substrate constructed with another exemplary but simplified configuration of a plurality of angled thermocouples and threaded with constantan copper wire according to a sap flow sensor embodiment of the present invention. In particular, this alternate embodiment contemplates using values from a single thermocouple pair as the 1-channel dT signal, thereby further reducing sap flow complexity and consequently reducing cost while maintaining acceptable accuracy for a number of implementation scenarios.

Referring again collectively to FIGS. 1-7, hook member 57 is affixed to the exterior surface of cork substrate 15 for securely being attached to a corresponding loop member affixed to the interior surface of flexible wrap member 59 of elastic hook-and-loop layer 55. More particularly, as will be appreciated by those skilled in the art, electronics body member 10, comprising the heater and heat-sensing electronics implementation of the present invention, is an exoskeleton single-wrapping about plant stem 5 which is first secured thereto with a Velcro® strap or the like attachment member.

Then, as specifically depicted in FIG. 2, this exoskeleton interior electronics layer is thoroughly concentrically wrapped with a special flexible layer 59 constructed from suitable material that affords a synergy of properties that assure that the integrity of the sap flow measurement contemplated hereunder is sustained. In preferred embodiments of the present invention, by way of example only, a stretch variation of the unique self-adhering characteristics of Velcro® commercially available as Velstretch® hook-and-loop fastener is constructed from a composite of breathable, porous nylon and Lycra® spandex which enables moisture and water vapor to flux from stem 5 and circumscribing sensor electronics 10 outwardly to the ambient. It has been found that wrapping Velstretch® tape or the like in a spiral configuration circumferentially about stem 5, as clearly shown in FIG. 2, tends to accomplish the crucial function of closing any and all air gaps between electronics exoskeleton body 10 and multi-layered surrounding insulation member 53.

It should be understood by those conversant in the art that, in order to achieve accurate sap flow measurement results contemplated hereunder, any and all air gaps existing within the exoskeleton sensor body must be thoroughly covered by a flexible stretch-wrap layer so as to minimize—if not eliminate—moisture accumulation on the plant stem or the like. In so doing, such moisture, rather than accumulating on the plant stem, has been observed to be conducted to another successive concentric layer as will be hereinafter described. It will be readily appreciated by those familiar with the art that the preferred spiral application of flexible wrap layer 59 may be effectuated either tightly or loosely, similar to the application of an Ace® elastic bandage or the like, e.g., by adjusting the pull-strength of the implicated Velcro® in order to accommodate structural idiosyncrasies of the plant stem and/or diurnal swelling and shrinking, or the like.

FIGS. 3 and 4 focus upon insulation layer 60 emplaced concentrically of hook-and-loop stretch layer 59. Insulation layer 60 comprises foam insulating collar member 65 that is structured with a plurality of individual collar members—each collar member being releasably secured with a plurality of strap members 64 or the like. In the preferred embodiments, each strap member 64 is constructed from Velcro®. Thus, in FIG. 3, the embodiment depicted includes a set of 2 such individual collar members secured with a set of 3 individual strap members.

Similarly, in FIG. 4, the embodiment depicted includes a set of 2 such individual collar members secured with a set of 2 individual strap members. Factors such as the number of twists and turns in a selected portion of plant stem and the length of the selected section determine the optimum number of collar members to invoke during in situ installation of the exoskeleton sap flow apparatus taught herein. As disclosed in detail in the '604 patent which has been incorporated herein by reference, representative the foam collars include waterproofed soft-cell foam such as Insul-Tube® manufactured by Halstead of North Carolina which affords closed-cell insulation attributable to a plethora of small diameter holes.

Referring now to FIGS. 4-7, there is depicted the multi-faceted insulation and protective layers 53 taught by the preferred embodiments. In particular, multi-faceted insulation layer 53 comprises inner hook-and-loop stretch layer 59 which is shown wrapped preferably in spiral configuration to achieve the panoply of insulation-related benefits hereinbefore described. The next outer layer of multi-faceted insulation layer 53, circumscribing hook-and-loop stretch layer 59, comprises soft-foam layer 60 which is secured by its self-contained plurality of strap members 64 which preferably secure a like plurality of soft-foam members 62. Nevertheless, it should be clearly understood that any number of such strap members may be invoked to secure virtually any number of soft-foam members in order to achieve the insulation and integrity objectives of the exoskeleton-based sap flow apparatus contemplated hereunder.

The next outer layer of multi-faceted insulation layer 53, circumscribing soft-foam layer 60 comprises membrane cloth layer 75 which should preferably be permeable to water vapor while being impermeable to water drops. In the preferred embodiments, this membrane cloth layer comprises a material constructed of polytetrafluorethylene (acronym "PTFE") such as Teflon® and having an impregnated synthetic fabric with the panoply of prerequisite properties, e.g., Gore-Tex® This special elastic cloth material has been found to be amenable to being wrapped around an inner insulation layer contemplated hereunder, and then, itself, be wrapped with reflective shielding to reduce harmful moisture accumulation. It will be appreciated that this membrane cloth layer, and an alternatively comprised layer exhibiting similar characteristics, extracts moisture from stem transpiration and sheds the moisture to an outermost layer comprising a reflective shield.

Those skilled in the art will comprehend that innumerable microscopic pores prevent penetration of large water droplets, while allowing much smaller water vapor molecules to pass through such membrane cloth. According to the present invention, such membrane cloth surrounds both the innermost sensor layer and the circumscribing insulation layers, thereby preventing ingress of rainwater, while simultaneously allowing water vapor flux to exit to the surrounding ambient, while also preventing accumulation of condensate within the sensor. Accordingly, water vapor exits the sensor area through the vapor-permeable layer while the circumscribing Gore-Tex® layer sheds water that condenses on a sheath between the sensor insulation and the reflective material disposed on the sensor's outermost layer. It has been observed that embodiments of the present invention facilitate water droplets running down the outer layers to ground.

Figure 5:
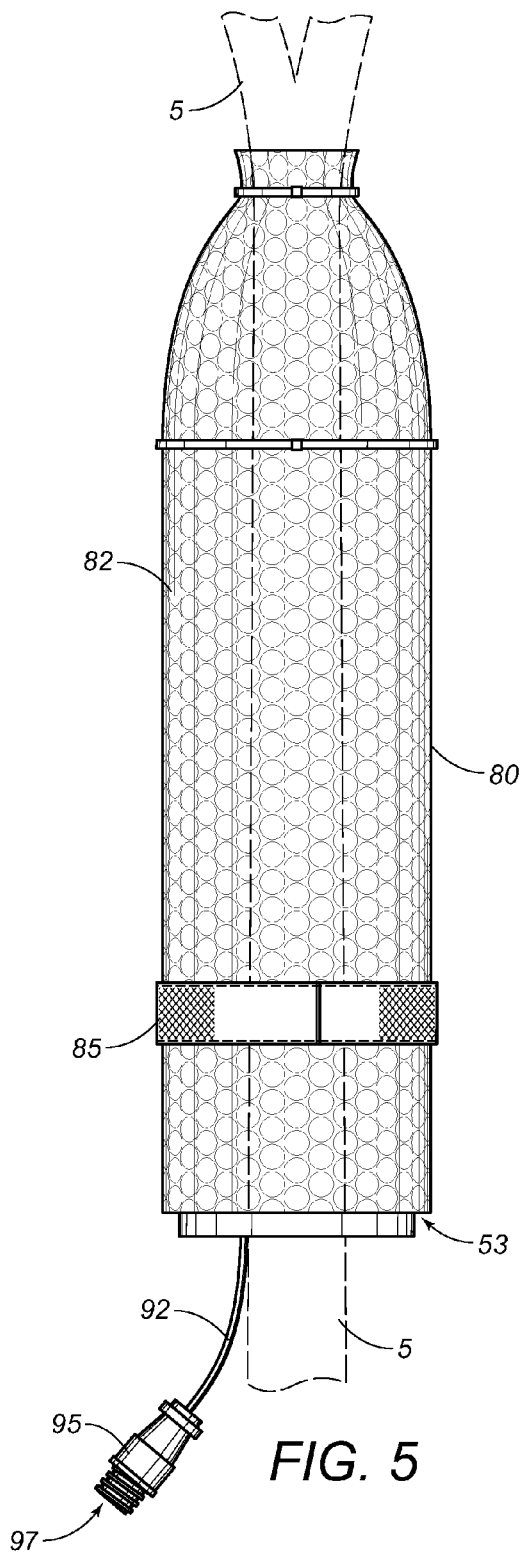
FIG. 5 depicts a frontal perspective view of the sap flow sensor embodiment of FIG. 4 still further enclosed within a flexible radiation barrier.
Figures 6, 7:
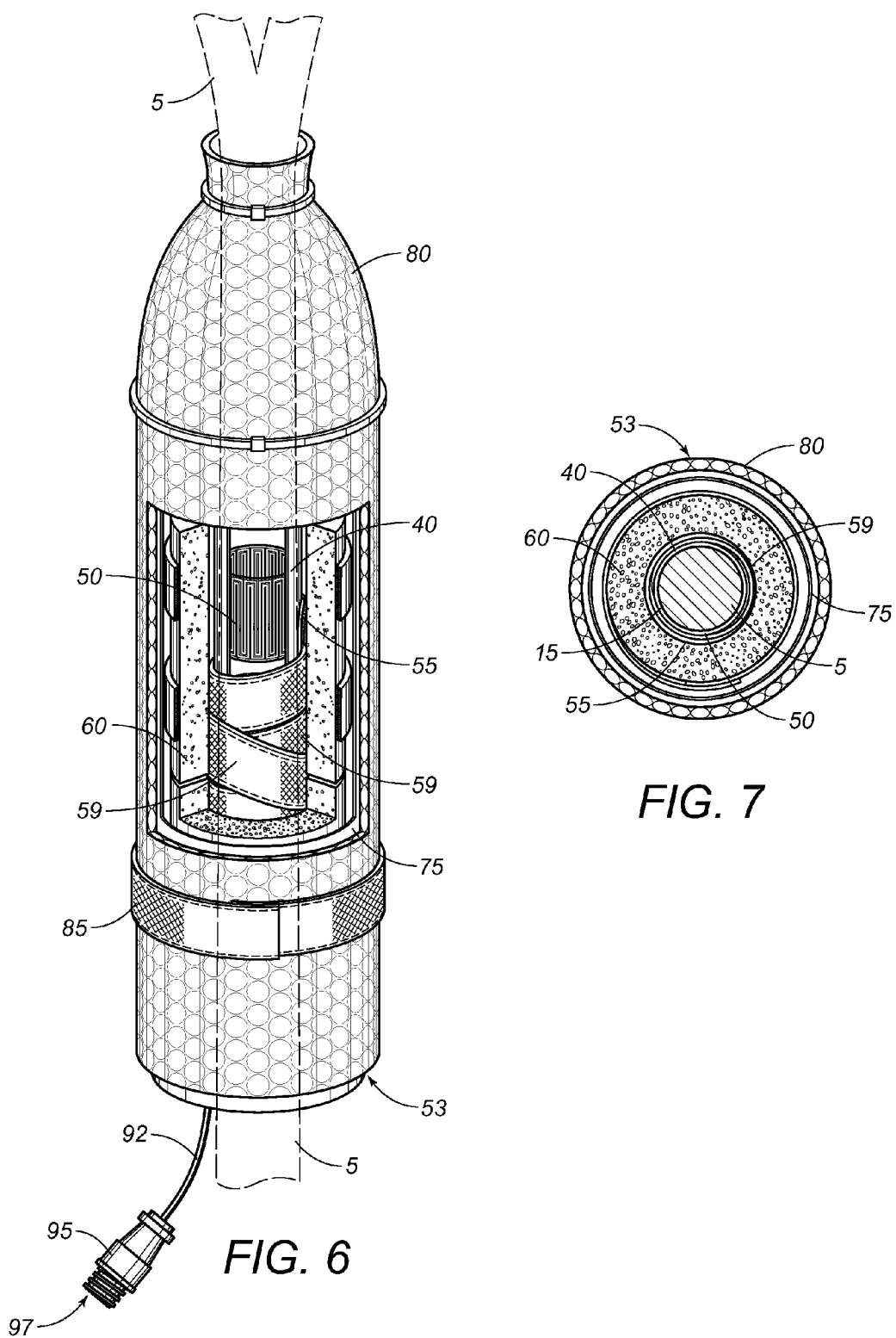
FIG. 6 depicts a partial frontal cut-away view of the embodiment depicted in FIGS. 1-5 depicting the in situ electronics assembly circumscribed by a plurality of insulating layers constituting an exoskeleton configuration.
FIG. 7 depicts a top partial cut-away view of the exoskeleton configuration of FIG. 6.

Now referring specifically to FIGS. 5-7, there is seen outermost radiation shield layer 80 which engulfs membrane cloth layer 75, whereupon this radiation shield layer effectively circumscribes and, indeed, engulfs all of the hereinbefore described layers. It will be understood that radiation shield layer 80 provides a reflective shield that blocks radiant heat from penetrating embodiments of the present invention and thereby threatening the integrity and efficacy of the internal electronics assembly 10. The preferred embodiments have engendered the contemplated excellent sap flow measurement attributes invoking reflective insulation and radiation barriers and concomitant foil tape manufactured by Reflectix Inc. of Indiana. Reflectix® reflective insulations constructed from metalized aluminum and radiant barriers, in conjunction with Reflectix® foil tape for joining ends thereof, provide a continuous and securely enclosed reflective surface that prevents air leakage and consequent condensation. Reflectix® reflective insulation and radiant and conductive barrier and foil tape function as contemplated hereunder within an acceptable range of $-51°$ C. to $82°$ C., thereby reducing the rate of radiant heat transfer across implicated air spaces. It has been found that Reflectix® reflective insulation having an R-value of 1.1 and configured as two layers of 96% flexible film (R-1.1 per layer) bonded to two internal layers of heavy gauge polyethylene bubble material affords adequate insulation and protection. That is, by including this outer radiation and conduction shield layer in the multi-layered insulation member engulfing the electronics body assembly of embodiments of the present invention, virtually all known causes of sap flow sensing measurement errors have been eliminated in experimental results.

FIGS. 12-20 show various experimental field test results that address the teachings of the present invention. A key aspect of this field-testing was to investigate the merits of the novel approach taught hereunder wherein an improved Heat Balance formula simplified the sap flow determination by reducing axial and radial heat conduction into one value result, which would then engender an aggregate value hypothesized to be proportional to axial and radial heat conduction values when determined individually. Thus, to test the efficacy of the innovative construction and concomitant electronic design enhancements taught by the present invention, a three-phase approach was implemented to investigate ramifications of sensor construction modifications manifest in an "EXO" exoskeleton SHB-design, and the improved thermocouple arrangements embodied in the exoskeleton "EXO-B" and "EXO-C" iSHB-designs.

It will be seen that the first phase established that resulting sap flow measurement attributes of the new simplified heat balance formula, namely, the iSHB formula, are equivalent to or even better than the comparable results of the original SHB formula. In a representative test of the iSHB formula, an evaluation was conducted by installing three sap flow sensors on Cabernet Sauvignon grape vines in Napa Valley, Calif. These sensors were constructed according to typical SHB devices as elucidated in detail in U.S. Pat. No. 5,269,183. The sap flow measurement results were evaluated in conjunction with two sets of formulas: the original SHB formula (equation 1) and the new iSHB formula (equation 9).

Figure 12:
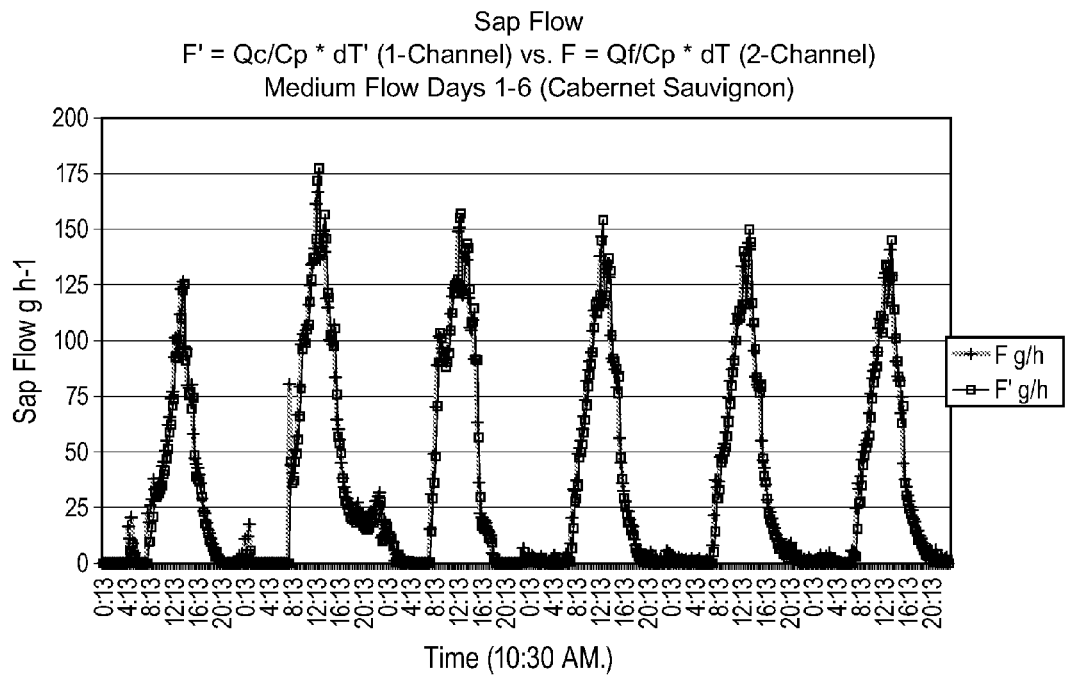
FIG. 12 depicts a plot of sap flow vs. time of day comparison between the improved SHB 1-channel method vs the traditional 2-channel method for Cabernet Sauvignon grapevines, for medium sap flow days.

Referring to FIG. 12 there is depicted a plot of comparative sap flow results are shown for the first six days for Cabernet Sauvignon grape vines for the two heat balance formulas for calculating sap flow from the same sensor. F (g/h) is the original SHB method and F' (g/h) is the new Qc per the new improved iSHB method—one-channel method. Medium sap flow up to 125 to 175 g/h during the first six days testing, and nearly identical sap flows were obtained by both methods on this sensor. A single TC-set, Bh, was selected to represent dT value which was offset about 0.5 cm lower than the mid-point of the combined values of Ah and Bh—averaged together.

Figure 13:
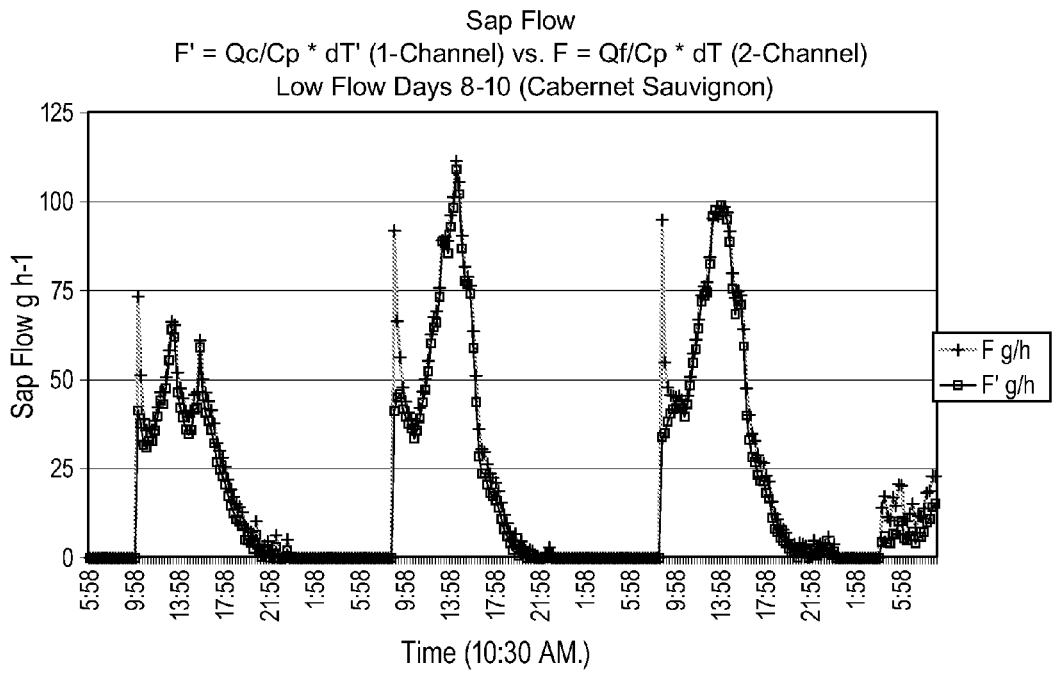
FIG. 13 depicts a plot of sap flow vs. time of day comparison between the improved SHB 1-channel method vs the traditional 2-channel method for Cabernet Sauvignon grapevines, for low sap flow days.

Referring now to the sap flow plot shown in FIG. 13, there is shown results obtained during the last three days of this test depicted in FIG. 12. In particular, the sap flow rates are compared within the same chart, ranging from flow rates of 70 to 110 g/h. Sap flow calculated per the new iSHB formula shows a notable difference in F' that does not have a large early morning peak shown in the comparable flow rate F calculated per the original SHB formula. It will be appreciated that this is a significant performance improvement, illustrating that dT is more representative if the lower TC position is offset further lower from the heater strip, and more representative of the ambient sap flow, while not being influenced by Qd. Overall, the performance for the first six days of field-testing demonstrates that a 1-channel design—requiring only a Qc computation—performs equally to the original SHB formula.

Figure 14:
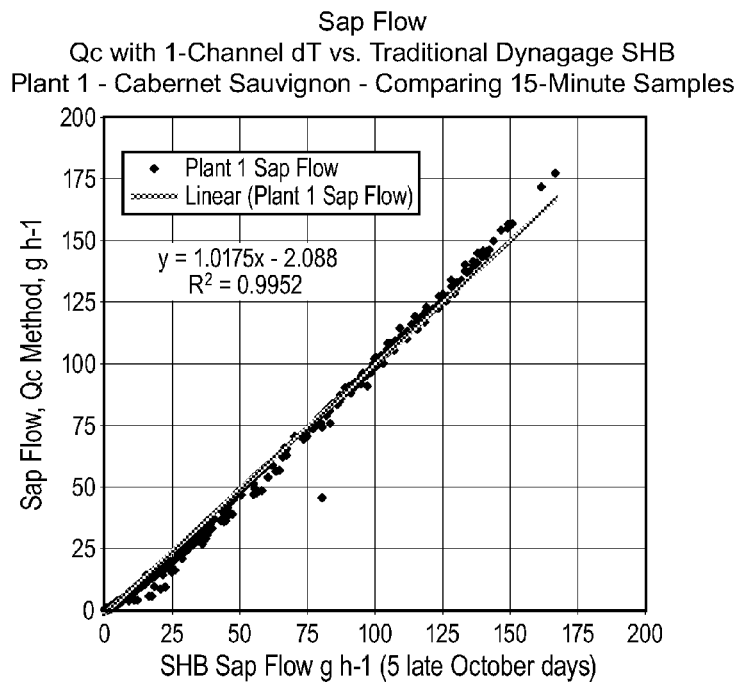
FIG. 14 depicts a plot of sap flow ascertained via the improved 1-channel energy balance method vs. sap flow ascertained via the traditional energy balance method.
Figure 15:
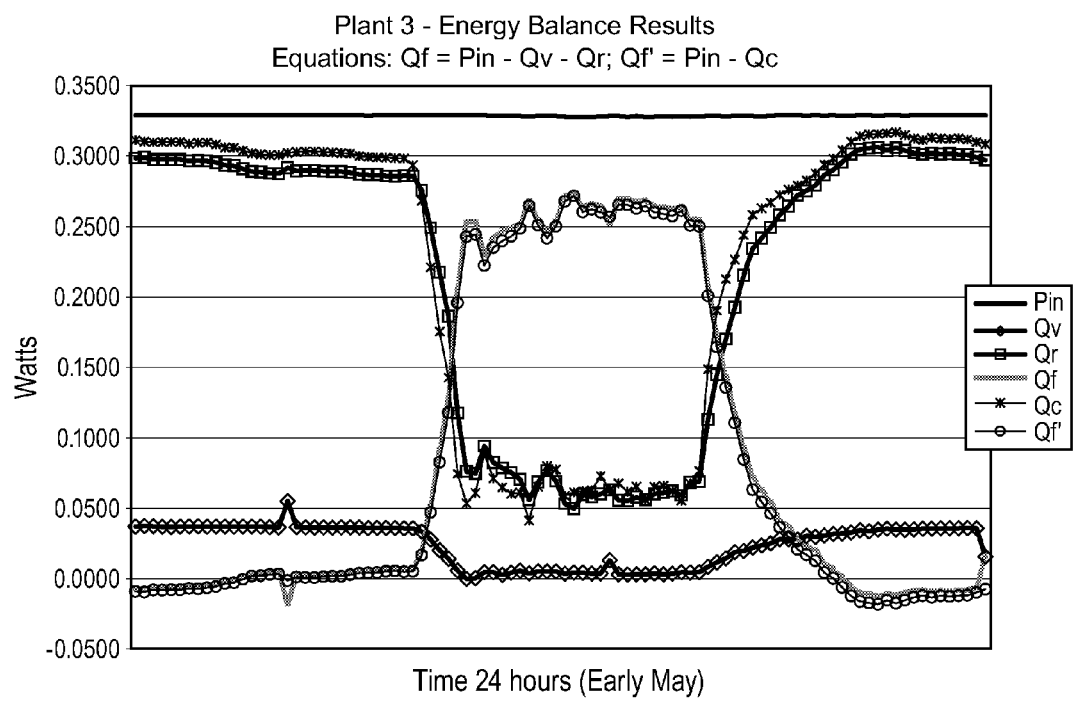
FIG. 15 depicts a plot of energy balance results vs. time of day in early May, comparing the improved and traditional energy balance methods.

Referring now to the sap flow plot of 15-minute samples depicted in FIG. 14, there is seen that the new methodology based upon the improved iSHB formula correlates with the traditional SHB methodology via linear regression represented by the formula for a straight line:

$$y=1.02x-1.97, \text{ where } R=0.99 \text{ (2\% overestimate)}$$

Two other sensors showed regression results that indicate, with maximum sap flow of less than 80 g/h over the 10-day period, linear regression slopes were ranged from 0.91 to 0.89 (R2=0.99).

In the second phase of this field-testing, two 19 mm sensors were constructed with dT measurements arranged according to the teachings of the present invention. It will be understood that identical TC junctions were configured in an offset manner, around the circumference, with the lower TC disposed 0.5 cm further lower from the heater than the upper TC. One 19 mm EXO-SHB sensor was constructed to have the TCs configured in a manner consistent with the disclosure of the '183 patent. As depicted in the plot of Energy Balance Results (watts) over a 24-hour time frame in early May depicted in FIG. 15, the EXO skeleton (EXO-C and EXO-B) and EXO-SHB sensor were comparatively evaluated on hibiscus plants under a variety of conditions. All EXO sensors were constructed with the new design having separated electronics in the sheath, and separate wrappings provided for insulation, water-shedding layer, and the reflective shield; and assembled in situ.

Figure 16:
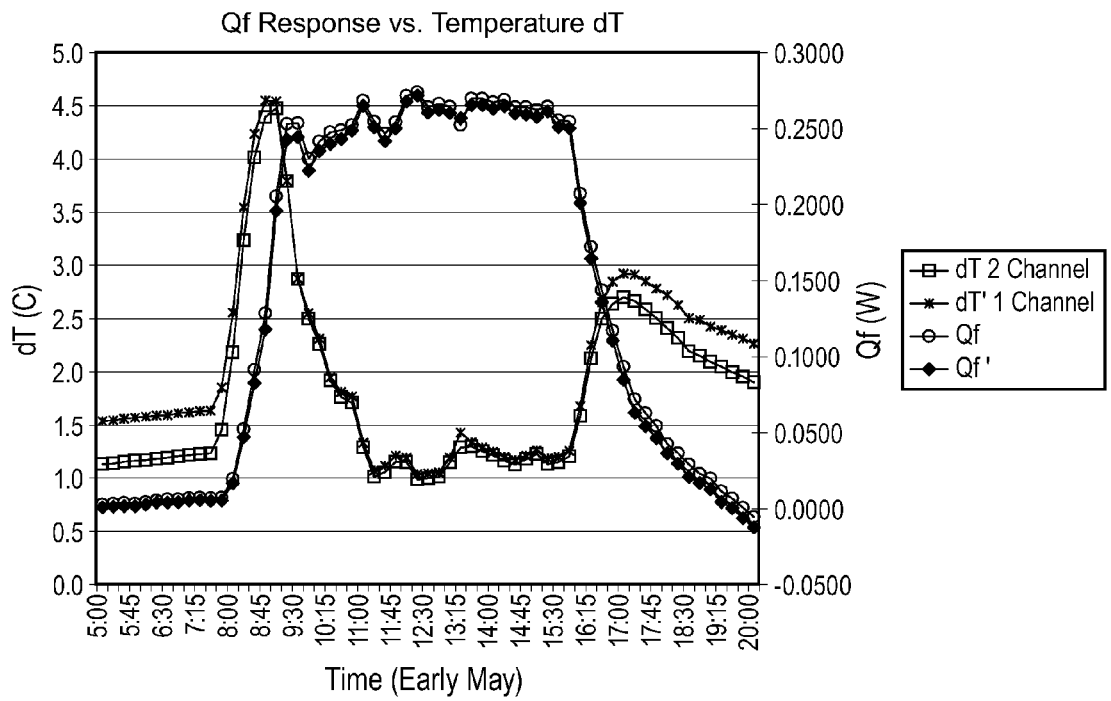
FIG. 16 depicts a plot of Qf response vs. temperature in an early May time frame.

In FIG. 16, there is shown a plot of Qf response vs. temperature dT for a time horizon in early May, comparatively testing the 1-channel dT' vs. the 2-channel dT, simultaneously with Qf' and Qf for a particular plant and using the EXO-SHB sensor. For this scenario, dT' (the 1-channel method) is offset by 0.5° C. higher than the 2-channel method. As anticipated, Qd is not influenced by the lower TC as much, and, thus, dT is higher. It will be appreciated by those skilled in the art, that at 8:00 am when the sap flow commences, indicated by Qf and Qf' rising rapidly, dT' remains at 0.5° C. higher than dT until 9:00 am when the dT values become nearly identical. It will also be understood that the validity of iSHB is thus confirmed, as Qv becomes negligible, the dT' and dT become virtually identical too. Accordingly, it would appear that there will be no performance difference manifest by the energy balance as the sap flow rates rise to higher flow rates.

Figure 17:
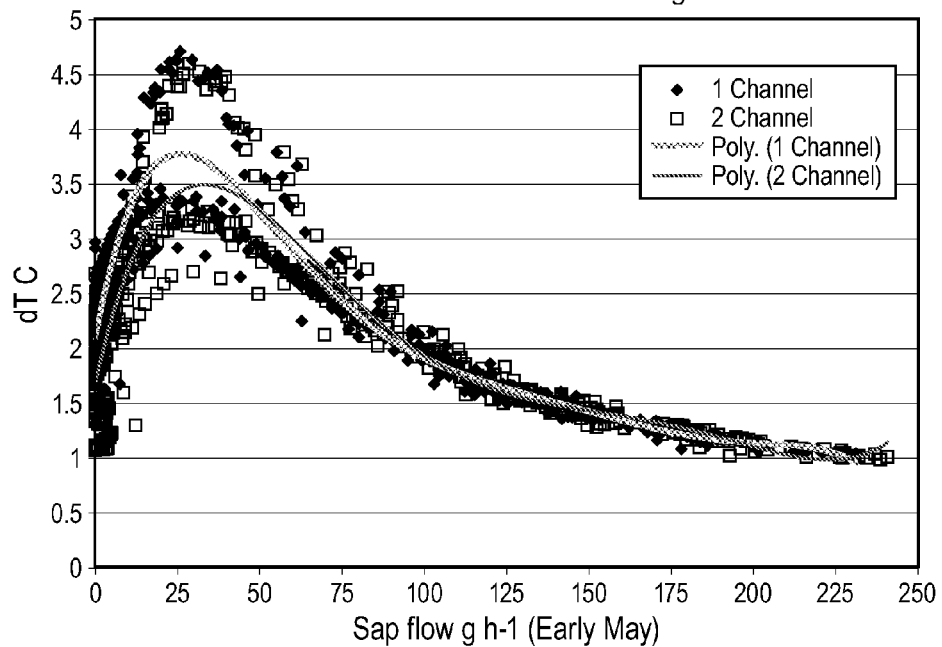
FIG. 17 depicts a plot of dT vs. sap flow comparing dT across a range of sap flow for a 1-channel and a 2-channel design sap flow measurement apparatus.

The plot of comparative dT across a range of sap flow measured by a 1-channel design sensor vs. a 2-channel design sensor is depicted in FIG. 17. As shown, dT' and dT were plotted for seven days versus the sap flow calculated based upon Qf' and Qf from the usual SHB method in the plot. From 0 to 25 g/h, a 6th-order polynomial regression shows that dT' is about 0.5° C. higher than dT. From 50 to 250 g/h, the regression shows that dT' is identical to dT—within a fraction of a degree.

Figure 18:
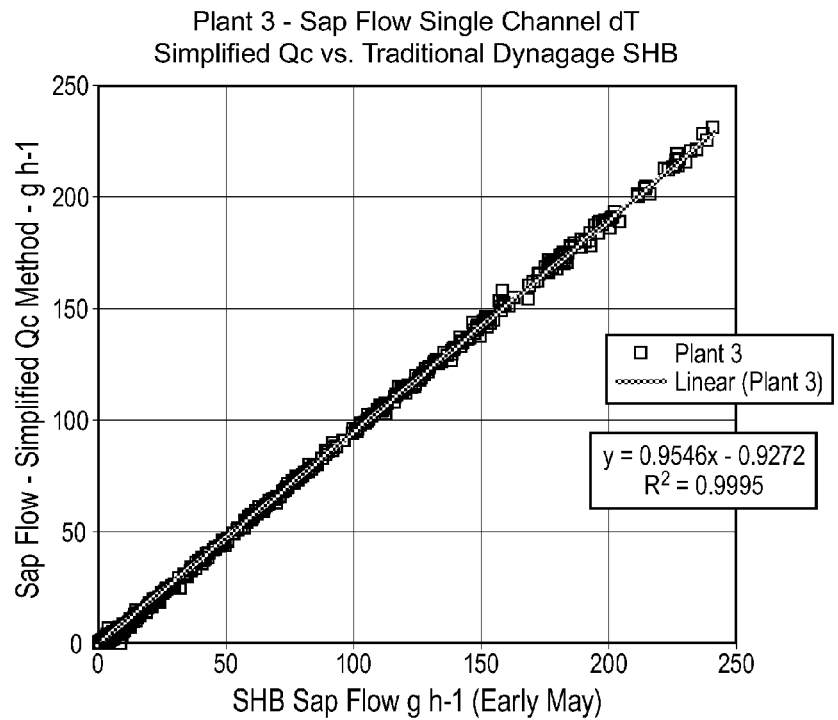
FIG. 18 depicts a plot of sap flow calculated via the simplified, improved Qc iSHB method vs. the traditional sap flow SHB method.

Now referring to FIG. 18, there is depicted a plot depicting the comparative performance of the two methods for calculating flow rates up to 250 g/h on the basis of a linear regression of:

$$y=0.95X-0.93, r2=0.999$$

It will be seen that the performance of the EXO-C and EXO-B sensors were evaluated and demonstrated that the sap flow rates for the new improved energy balance method were highly correlated with this plant (plant 3), and that the flow rates were proportional to the sap flow from this plant in relation to the leaf area of the separate plants (r2=0.93).

In Phase Three of this experimental field-testing, the EXO sensor construction performance was independently verified against a gas exchange system measurement. In particular, an experiment was conducted on two grape vines enclosed with an open gas exchange measurement for photosynthesis and transpiration. Each plant was simultaneously measured with 23 mm diameter EXO-SHB sensors. The gas exchange systems were constructed as described in the paper by J. P. Pena and J. Trata entitled "A Portable Whole Canopy Gas Exchange System for Several Mature Field-Grown Grapevines" published in Vitis 43 (1), 7-14 (2004).

Figure 19:
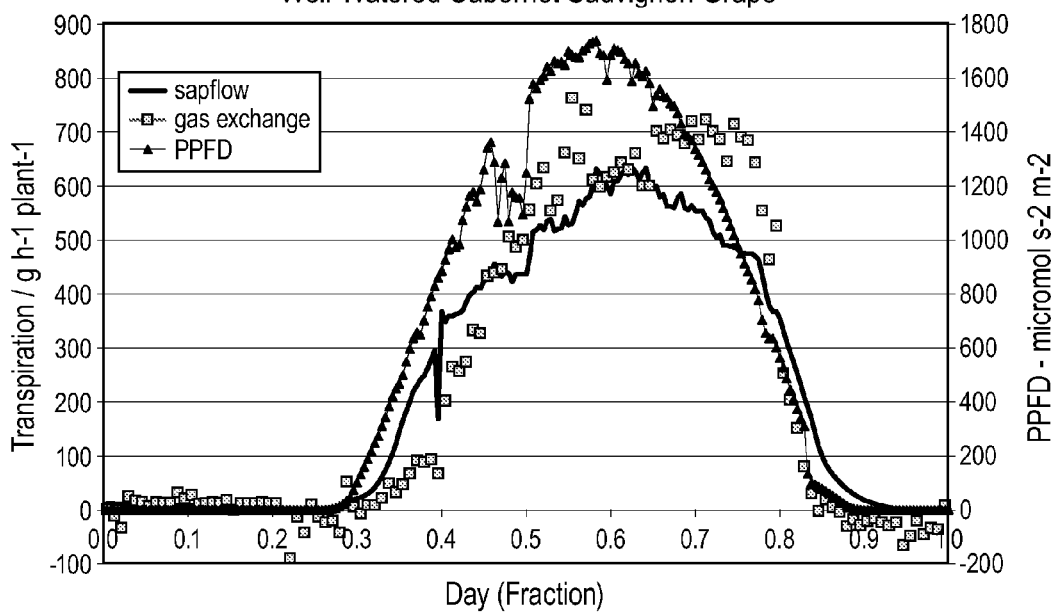
FIG. 19 depicts a plot of transpiration vs. day-fraction comparing transpiration with sap flow ascertained for a well-watered Cabernet Sauvignon grapevine.

Now referring to FIG. 19, there is shown a plot of transpiration compared with sap flow over a fraction of a day for a well-watered Cabernet Sauvignon grapevine during a July-August time frame. Sap flow was evaluated while recording transpiration determined by the difference between incoming and outgoing water vapor concentrations ascertained via an infrared analyzer, and then converted to whole plant transpiration with the product of volumetric flow rate of air through the chamber. For the representative sample depicted in the plot, well-watered grapevine transpiration is compared with sap flow from the EXO sensor for mid-range of July 31. The very close relationship manifest on this day was indeed representative of the majority of data collected during this predetermined 2-month time period. It will be appreciated that both the transpiration and the sap flow compares with photosynthetic photon flux density (PPFD). As is known by those skilled in the art, PPFD is the dominant energy flux, the main driving force for transpiration in well-watered plants, since light density is the main representation of solar energy, and PPFD has a proportional affect on air temperature and a direct influence on the vapor pressure deficit (VPD).

Figure 20:
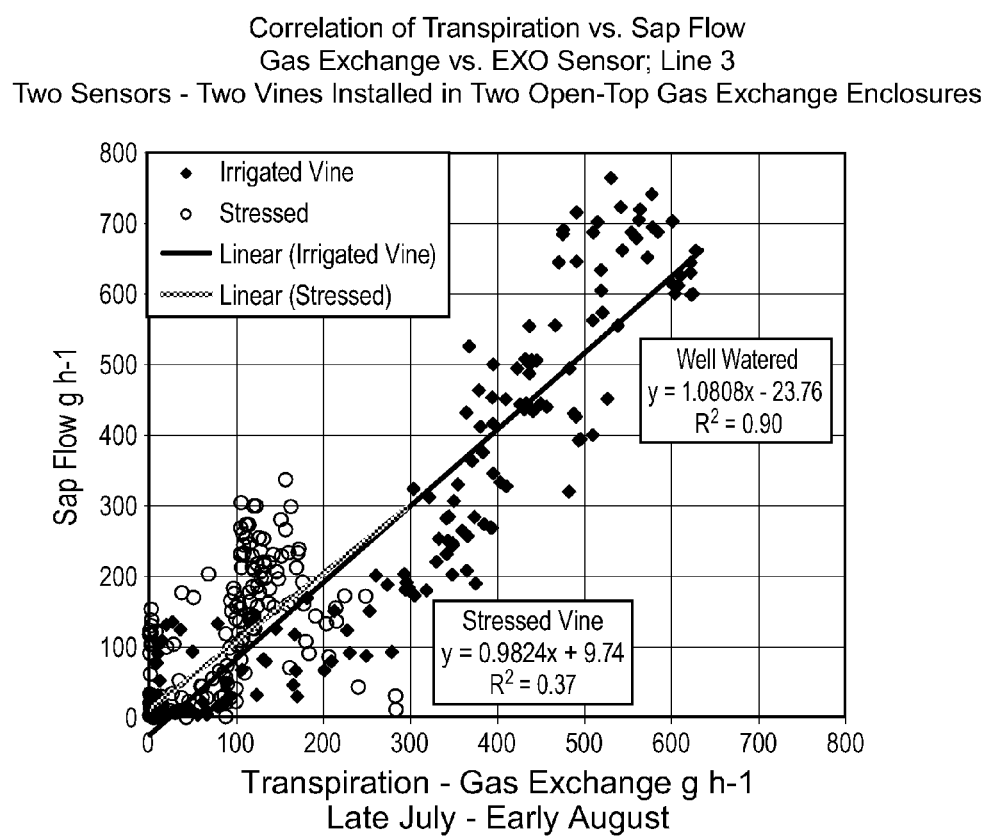
FIG. 20 depicts a plot of sap flow vs. transpiration correlating transpiration ascertained by gas exchange vs. sap flow ascertained by an EXO sensor for two grapevines.

During Phase Three, stressed vines were also monitored and the results of a linear regression correlating transpiration vs. sap flow observed and measured over a two-day period for well-watered, and separately stressed plants, is depicted in FIG. 20. Table 1 compares gas exchange and sap flow results accumulated during 48 hours. Resolution of sap flow is 6 minutes per readings, and 12 minute for gas exchange. Gas exchange result was converted from mmols s-1 to g h-1 so the results are comparable directly. For example, the sap flow on July 31 for the well-watered plant was 5574 g, or about 5.6 liters of water. The transpiration accumulated to the same day by gas exchange measurement was 5.7 liters.

| Well Irrigated Plant - Daily Total | | Stressed Plant - Daily Total | | |
|---|---|---|---|---|
| Sap Flow (g) | Gas Exch (g) | Sap Flow (g) | Gas Exch (g) | Date/Avg |
| 5574 | 5684 | 1757 | 1747 | Jul. 31 |
| 98% | | 101% | | 99% |
| 4153 | 3604 | 1382 | 1763 | Aug. 1 |
| 115% | | 78% | | 97% |

Two days of accumulated sap flow data are compared with accumulated gas exchange readings from two representative days in the plot shown in FIG. 20. Data from midnight to 7 am is excluded from both methods due to removal of erratic gas exchange readings. On the average, over the 2-day period, the comparative results are within 3%. Due to uncertainty associated with short-term measurements of gas exchange at very low IRGA readings, considerable fluctuation has occurred in the low flow data set. However, the overall accumulated values for gas exchange agree at both high and low sap flow rates. When summed together, water use computed via the two methods were very similar to the results obtained by widely published gravimetric methods. See, e.g., D. A. Devit, et al., "Estimating Transpiration for Three Woody Ornamental Tree Species using Stem-Flow Gauges and Lysimetry" published in HortScience 28(4):320-322 (1993).

It will be seen that on stressed plants, the gas exchange is compared on a very short time period and with low resolution attributable to a large chamber volume and running at high flow rates. On this basis, a 0.37 r2 was obtained with a regression slope of 0.98. Nevertheless, it be readily appreciated that both stressed and well-watered comparison trends are incredibly close to 1:1. Ergo, the efficacy and clear benefits of embodiments of the present invention have been established from field-testing under various ambient environments and during various time periods and times of day.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims herein.

What is claimed is:

1. A portable sensing apparatus for measuring sap flow in a stem region of a plant, and electrically interconnected with dataloggers for monitoring electrical signals functionally related to said sap flow in said plant, said portable sensing apparatus comprising:
a flexible substrate having embedded therein an electronics assembly comprising a first pair of temperature-sensing devices and a second pair of temperature-sensing devices, and a thermopile with a heating strip also embedded therein and disposed between said first pair of temperature-sensing devices and said second pair of temperature-sensing devices;
said first pair of temperature-sensing devices disposed above said thermopile heating strip and said second pair of temperature-sensing devices disposed below said thermopile heating strip, and said first pair of temperature-sensing devices and said second pair of temperature-sensing devices electrically arranged in parallel, thereby automatically averaging two signals, with each said signal generated from each of two said pairs of temperature-sensing devices, into 1 dT temperature value; and
said thermopile disposed longitudinally of said flexible substrate and having a plurality of temperature-sensing devices electrically interconnected in series for generating a signal responsive to all conduction energy losses as sap flows through said stem region of said plant, and for calculating sap flow rate from a simplified energy balance formula wherein all said conduction energy losses are grouped together into a single conduction value and heat from said conductivity is functionally related solely to radial power engendered by said heating strip.

2. The portable sensing apparatus for measuring sap flow in a stem region of a plant recited in claim 1, wherein said second pair of temperature-sensing devices is offset below said heating strip 50-100% further than said first pair of temperature-sensing devices is positioned above said heating strip, configured to reduce or eliminate errors attributable to natural temperature gradients between ground and said plant stem, to stored heat, and to other ambient-related error conditions.

3. The portable sensing apparatus for measuring sap flow in a stem region of a plant recited in claim 1, wherein said first pair of temperature-sensing devices comprises a first pair of thermocouples.

4. The portable sensing apparatus for measuring sap flow in a stem region of a plant recited in claim 1, wherein said second pair of temperature-sensing devices comprises a second pair of thermocouples.

5. The portable sensing apparatus for measuring sap flow in a stem region of a plant recited in claim 1, wherein said plurality of temperature-sensing devices of said thermopile comprises a like plurality of copper-constantan thermocouples.

6. The portable sensing apparatus for measuring sap flow in a stem region of a plant recited in claim 1, wherein said first pair of temperature-sensing devices comprises a first pair of thermistors.

7. The portable sensing apparatus for measuring sap flow in a stem region of a plant recited in claim 1, wherein said second pair of temperature-sensing devices comprises a second pair of thermistors.

8. The portable sensing apparatus for measuring sap flow in a stem region of a plant recited in claim 1, wherein said plurality of temperature-sensing devices of said thermopile comprises a like plurality of thermistors.

9. The portable sensing apparatus for measuring sap flow in a stem region of a plant recited in claim 1, wherein said first pair of temperature-sensing devices comprises a first pair of infrared temperature-sensing devices.

10. The portable sensing apparatus for measuring sap flow in a stem region of a plant recited in claim 1, wherein said second pair of temperature-sensing devices comprises a second pair of infrared temperature-sensing devices.

11. The portable sensing apparatus for measuring sap flow in a stem region of a plant recited in claim 1, wherein said plurality of temperature-sensing devices of said thermopile comprises a like plurality of infrared temperature-sensing devices.

12. A portable sensing apparatus for measuring sap flow in a stem region of a plant, and electrically interconnected with dataloggers for monitoring electrical signals functionally related to said sap flow in said plant, said portable sensing apparatus comprising:

a flexible substrate having embedded therein an electronics assembly comprising a pair of temperature-sensing devices thermocouples and a thermopile with a heating strip also embedded therein and disposed between a first temperature-sensing device thermocouple of said pair of thermocouples and a second temperature-sensing device thermocouple of said pair of thermocouples;

said first temperature-sensing device thermocouple disposed above said thermopile heating strip and said second temperature-sensing device thermocouple disposed below said thermopile heating strip, with each said signal generated from each of two said temperature-sensing device thermocouples, into 1 dT temperature value; and said thermopile disposed longitudinally of said flexible substrate and having a plurality of copper-constantan temperature-sensing devices thermocouples electrically interconnected in series for generating a signal responsive to all conduction energy losses as sap flows through said stem region of said plant, and for calculating sap flow rate from a simplified energy balance formula wherein all said conduction energy losses are grouped together into a single conduction value and heat from said conductivity is functionally related solely to radial power engendered by said heating strip.

13. The portable sensing apparatus for measuring sap flow in a stem region of a plant recited in claim 12, wherein said second temperature-sensing device thermocouple is offset below said heating strip 50-100% further than said first temperature-sensing device thermocouple is positioned above said heating strip, configured to reduce or eliminate errors attributable to natural temperature gradients between ground and said plant stem, to stored heat, and to other ambient-related error conditions.

14. The portable sensing apparatus for measuring sap flow in a stem region of a plant recited in claim 12, wherein said first temperature-sensing device comprises a first thermocouple.

15. The portable sensing apparatus for measuring sap flow in a stem region of a plant recited in claim 12, wherein said second temperature-sensing device comprises a second thermocouple.

16. The portable sensing apparatus for measuring sap flow in a stem region of a plant recited in claim 12, wherein said plurality of temperature-sensing devices of said thermopile comprises a like plurality of copper-constantan thermocouples.

17. The portable sensing apparatus for measuring sap flow in a stem region of a plant recited in claim 12, wherein said first temperature-sensing device comprises a first thermistor.

18. The portable sensing apparatus for measuring sap flow in a stem region of a plant recited in claim 12, wherein said second temperature-sensing device comprises a second thermistor.

19. The portable sensing apparatus for measuring sap flow in a stem region of a plant recited in claim 12, wherein said plurality of temperature-sensing devices of said thermopile comprises a like plurality of thermistors.

20. The portable sensing apparatus for measuring sap flow in a stem region of a plant recited in claim 12, wherein said first temperature-sensing device comprises a first infrared temperature-sensing device.

21. The portable sensing apparatus for measuring sap flow in a stem region of a plant recited in claim 12, wherein said second temperature-sensing device comprises a second infrared temperature-sensing device.

22. The portable sensing apparatus for measuring sap flow in a stem region of a plant recited in claim 12, wherein said plurality of temperature-sensing devices of said thermopile comprises a like plurality of infrared temperature-sensing devices.

23. A portable temperature-sensing apparatus for measuring sap flow in a stem region of a plant comprising:

a flexible substrate having an electronics assembly embedded upon its top surface, said electronics assembly comprising a first pair of temperature-sensing devices and a second pair of temperature-sensing devices, and a thermopile with a heating strip also embedded thereupon and disposed between said first pair of temperature-sensing devices and said second pair of temperature-sensing devices;

said thermopile disposed longitudinally of said flexible substrate and having a plurality of temperature-sensing devices electrically interconnected in series for generating a signal responsive to radial conduction energy losses as sap flows through said stem region of said plant; and said electronics assembly encapsulated with liquid sealant applied to both sides thereof.

24. The portable temperature-sensing apparatus recited in claim 23, wherein said liquid sealant comprises liquid electrical tape.

25. A portable temperature-sensing apparatus for measuring sap flow in a stem region of a plant comprising:

a flexible substrate having an electronics assembly embedded upon its top surface, said electronics assembly comprising a first pair of temperature-sensing devices and a second pair of temperature-sensing devices, and a thermopile with a heating strip also embedded thereupon and disposed between said first pair of temperature-sensing devices and said second pair of temperature-sensing devices;

said thermopile disposed longitudinally of said flexible substrate and having a plurality of temperature-sensing devices electrically interconnected in series for generating a signal responsive to radial conduction energy losses as sap flows through said stem region of said plant;

said electronics assembly encapsulated with liquid sealant applied to both sides thereof; and a waterproof membrane cloth layer permeable to water vapor and impermeable to water drops securely wrapped around said portable temperature-sensing apparatus when snuggly and frictionally secured to said plant stem region.

26. The portable temperature-sensing apparatus recited in claim 25, wherein said membrane cloth layer comprises a Gore-Tex® synthetic fabric impregnated with Teflon® polytetrafluorethylene.

27. A portable temperature-sensing apparatus for measuring sap flow in a stem region of a plant comprising:

a flexible substrate having an electronics assembly embedded upon its top surface, said electronics assembly comprising a first temperature-sensing device and a second temperature-sensing device, and a thermopile with a heating strip also embedded thereupon and disposed between said first temperature-sensing device and said second temperature-sensing device;

said thermopile disposed longitudinally of said flexible substrate and having a plurality of temperature-sensing devices electrically interconnected in series for generating a signal responsive to radial conduction energy losses as sap flows through said stem region of said plant; and said electronics assembly encapsulated with liquid sealant applied to both sides thereof.

28. The portable temperature-sensing apparatus recited in claim 27, wherein said liquid sealant comprises liquid electrical tape.

29. A portable temperature-sensing apparatus for measuring sap flow in a stem region of a plant comprising:

a flexible substrate having an electronics assembly embedded upon its top surface, said electronics assembly comprising a first temperature-sensing device and a second temperature-sensing device, and a thermopile with a heating strip also embedded thereupon and disposed between said first temperature-sensing device and said second temperature-sensing device;

said thermopile disposed longitudinally of said flexible substrate and having a plurality of temperature-sensing devices electrically interconnected in series for generating a signal responsive to radial conduction energy losses as sap flows through said stem region of said plant;

said electronics assembly encapsulated with liquid sealant applied to both sides thereof; and a waterproof membrane cloth layer permeable to water vapor and impermeable to water drops securely wrapped around said portable temperature-sensing apparatus when snuggly and frictionally secured to said plant stem region.

30. The portable temperature-sensing apparatus recited in claim 29, wherein said membrane cloth layer comprises a Gore-Tex® synthetic fabric impregnated with Teflon® polytetrafluorethylene.

31. A method for in situ installation of a portable temperature-sensing apparatus for measuring sap flow in a stem region of a plant, said method comprising the steps of:

selecting a section of said stem region of said plant and removing superficial debris and other extraneous loose surface imperfections;

emplacing a flexible substrate comprising a sealed electronics assembly snuggly and frictionally about said selected plant stem section, and securing said substrate thereto; and stretch-wrapping said emplaced flexible substrate in a spiral configuration with a self-adhering attachment member.

32. The method for in situ installation of a portable temperature-sensing apparatus for measuring sap flow in a stem region of a plant recited in claim 31, wherein said stretch-wrapping step comprises uses material having a hook-and-loop combination.

33. The method for in situ installation of a portable temperature-sensing apparatus for measuring sap flow in a stem region of a plant recited in claim 32, wherein said stretch-wrapping step comprises uses Velcro® Velstretch® material.

34. A method for in situ installation of a portable temperature-sensing apparatus for measuring sap flow in a stem region of a plant, said method comprising the steps of:

selecting a section of said stem region of said plant and removing superficial debris and other extraneous loose surface imperfections;

emplacing a flexible substrate comprising a sealed electronics assembly snuggly and frictionally about said selected plant stem section, and securing said substrate thereto; and enclosing said flexible substrate with a waterproof membrane cloth layer permeable to water vapor and impermeable to water drops.

35. The method for in situ installation of a portable temperature-sensing apparatus for measuring sap flow in a stem region of a plant recited in claim 34, wherein said waterproof membrane cloth layer comprises a Gore-Tex® synthetic fabric impregnated with Teflon® polytetrafluorethylene.

* * * * *